US012693081B2

(12) United States Patent
Danci et al.

(10) Patent No.: US 12,693,081 B2
(45) Date of Patent: Jul. 28, 2026

(54) FOULING STATUS

(71) Applicant: ABB Schweiz AG, Bruggerstrasse (CH)

(72) Inventors: Alex Danci, Tölby (FI); Jouni Ikäheimo, Vaasa (FI)

(73) Assignee: ABB Schweiz AG, Baden (CH)

( * ) Notice: Subject to any disclaimer, the term of this patent is extended or adjusted under 35 U.S.C. 154(b) by 345 days.

(21) Appl. No.: 18/440,091

(22) Filed: Feb. 13, 2024

(65) Prior Publication Data

US 2024/0271892 A1      Aug. 15, 2024

(30) Foreign Application Priority Data

Feb. 15, 2023    (EP) ..................................... 23156701

(51) Int. Cl.
  *F28F 27/00*          (2006.01)
  *G01K 17/08*          (2006.01)
(52) U.S. Cl.
  CPC .............. *F28F 27/00* (2013.01); *G01K 17/08* (2013.01); *F28F 2200/00* (2013.01)
(58) Field of Classification Search
  CPC ......... F28F 27/00; F28F 2200/00; F28F 3/02; F28F 3/048; G01K 17/08; F28G 15/003; H02K 5/18; F28D 2021/0029; F28D 2021/004
  See application file for complete search history.

(56) References Cited

U.S. PATENT DOCUMENTS

| | | | | |
|---|---|---|---|---|
| 9,784,703 | B2* | 10/2017 | Budde | G01N 25/72 |
| 2010/0193175 | A1* | 8/2010 | Gilliland | F28F 1/08 |
| | | | | 165/104.31 |
| 2015/0289416 | A1 | 10/2015 | Kim et al. | |
| 2018/0051945 | A1 | 2/2018 | Hanov et al. | |
| 2023/0349848 | A1* | 11/2023 | Kakosimos | G01K 17/08 |

FOREIGN PATENT DOCUMENTS

| | | |
|---|---|---|
| EP | 0470676 A2 | 2/1992 |
| EP | 0470676 A3 | 9/1992 |
| EP | 2682835 A2 | 1/2014 |
| EP | 2682835 A3 | 1/2014 |
| WO | 2019001683 A1 | 1/2019 |
| WO | 2021180581 A1 | 9/2021 |

OTHER PUBLICATIONS

European Search Report; Application No. EP 23 15 6701; Issued: Aug. 2, 2023; 3 Pages.

* cited by examiner

*Primary Examiner* — John E Breene
*Assistant Examiner* — Manuel Salvador Castellon, Jr.
(74) *Attorney, Agent, or Firm* — Greenberg Traurig, LLP

(57)          ABSTRACT

A first temperature value indicating a temperature near a heat source, a second temperature value indicating a temperature near an outer end of a cooling rib extending from the heat source, and a third temperature value indicating an ambient temperature in the location of the heat source are used to determine fouling status.

20 Claims, 4 Drawing Sheets

FOULING STATUS

REFERENCE TO RELATED APPLICATIONS

This application claims priority to European patent application no. 23 156 701, filed on Feb. 15, 2023, the contents of which is hereby incorporated herein by reference in its entirety.

TECHNICAL FIELD

The present invention relates to fouling status determination.

BACKGROUND

Cooling fins or ribs are used for cooling different heat sources, such as electric motors, or transferring heat from heat sources, such as heat exchangers, for example. Especially in industrial sites, dirt, such as dust and other particulates, is likely to accumulate on surfaces of the cooling ribs. Because a dirt layer on a surface acts as an insulating blanket, cooling efficiency, or heat transfer efficiency, of a cooling rib decreases with increasing dirt layer thickness. Decreased cooling efficiency increases the temperature of a device cooled by the cooling ribs, and a temperature increase which in turn will reduce a lifetime of the device. One way is to have prescheduled maintenance breaks during which the cooling ribs are checked and cleaned, if needed. However, it is very difficult to foresee how often the maintenance breaks are needed, since the conditions vary even in one industrial site. Thus, it would be beneficial to find a solution that would not depend on the prescheduled maintenance.

SUMMARY

The invention relates to a method, an arrangement, an apparatus, a computer program product, and a computer-readable medium, which are characterized by what is stated in the independent claims. Further embodiments are disclosed in the dependent claims.

A general aspect introduces use of temperature values for fouling status determination, the temperature values indicating temperatures in three different places, and more precisely one indicating ambient temperature, one indicating temperature near a heat source and one indicating temperature near an outer end of a cooling rib.

BRIEF DESCRIPTION OF THE DRAWINGS

In the following, exemplary embodiments will be described in greater detail with reference to accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system or arrangement that comprises one or more heat sources wherefrom heat is transferred by using cooling ribs. The cooling, or transferring heat, may use air, or any other gas, or liquid, i.e. any suitable fluid for the cooling, or transferring heat. In the below examples an electric motor is used as a non-limiting example of a heat source, i.e. a device cooled by the cooling ribs. It is a straightforward task for one skilled in the art to apply the examples to another type of a heat source, such as a heat exchanger.

Different embodiments and examples are described below using single units, models, devices (equipment) and data storages (memory), without restricting the embodiments/examples to such a solution. A concept called virtualization may be used. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment.

Figure 1:
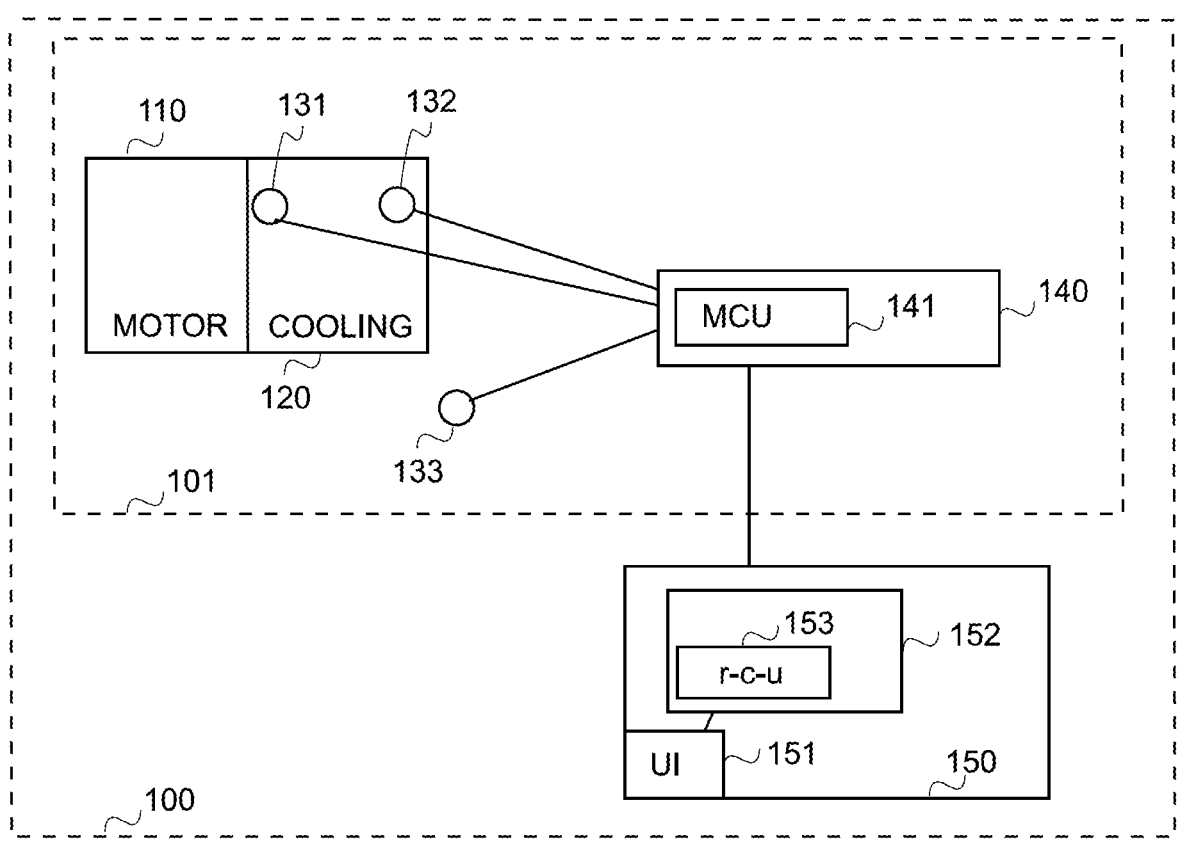
FIG. 1 shows simplified architecture of a system and block diagrams of exemplified equipments.

A general exemplary architecture of a system is illustrated in FIG. 1. FIG. 1 is a simplified system architecture of a distributed deployment scenario only showing some equipment (apparatuses, devices) and functional entities, all being logical units whose implementation and/or number may differ from what is shown in FIG. 1. The connections shown in FIG. 1 are logical connections; the actual physical connections may be different. It is apparent to a person skilled in the art that the systems may comprise any number of shown elements and that the systems may also comprise other elements, equipment, functional entities and structures, some of which may be used in or for remote maintenance, maintenance on site, big data, data management, and communication in the system or in one part of the system. They, as well as the protocols used, are well known by persons skilled in the art and are irrelevant to the actual invention. Therefore, they need not to be discussed in more detail here.

In the example illustrated in FIG. 1, the system 100 comprises one or more industrial sites 101 (only one illustrated in FIG. 1) connected over one or more networks (none shown in FIG. 1) to a remote service center 150. It should be appreciated that the industrial site is used as an example only, and the examples and embodiments can be deployed in any environment, including non-industrial environments, comprising one or more rib cooled devices, or heat sources, such as electric motors. A non-limiting list of examples of environments includes power plants, manufacturing plants, chemical processing plants, power transmission systems, mining and mineral processing plants, upstream oil and gas systems, data centers, ships, transportation fleet systems, utility plants, trains, trams, electric vehicles, apartment buildings, office buildings, homes, farms, barns, schools, shops, etc. For example, electric motors may be used in conveyors, grinders, winders, pumps, fans, lifts, people movers, building automation, etc.

In the illustrated example of FIG. 1, the industrial site 101 comprises one or more rib cooled electric motors, one illustrated in FIG. 1. A rib cooled electric motor is an electric motor 110, arranged to be cooled by means of a cooling arrangement 120 comprising a plurality of cooling ribs (not separately shown in FIG. 1), the cooling ribs forming a heat sink. The cooling arrangement 120 may comprise one or more fans (none shown in FIG. 1) forcing air, or liquid, for example, to move at least within the cooling arrangement. Further, the cooling arrangement 120 comprises two temperature sensors 131, 132, one temperature sensor 131 near the electric motor (near a heat source, e.g. near the heat sink rib root) and one temperature sensor 132 near an outer end of a cooling rib extending from the electric motor, i.e. near an outer end of the heat sink. The industrial site comprises a third temperature sensor 133 that locate in the industrial site in a location where it can measure the ambient temperature near the electric motor (heat source) and the heat sink. It should be appreciated that there may be, per an electric motor, a temperature sensor 133 to measure the ambient temperature, and/or two or more electric motors may share one temperature sensor 133 measuring the ambient temperature. The temperature sensors may be temperature probes, thermocouples, resistance temperature detectors, for example platinum resistance thermometers, such as PT100, or digital sensors, such as Maxim DS18B20 1-wire digital thermometers.

In the illustrated example of FIG. 1, the temperature sensors 131, 132, 133 have wired local connections to a control module 140 on site. A wired local connection may use analog signals, Ethernet or universal serial bus (USB), for example. It should be appreciated that any of the local connections, or all of them, may be a wireless local connection. The wireless local connection may be based on a short-range communication technology. A non-limiting list of examples for short-range communication technologies include Bluetooth® communication standards, and other wireless local area network technologies, such as radio frequency technologies including Wi-Fi, ZigBee, near field communication (NFC), radio-frequency identification (RFID), and optical wireless technologies including Li-Fi and other technologies using at least one of visible light spectrum, ultraviolet and infrared radiation. Naturally the wireless local connection may use any mobile wireless technology, such LTE, 3G, 4G, 5G and beyond.

The industrial site 101 comprises one or more control modules (one illustrated in FIG. 1). The control module may be a programmable logic controller, for example. There may be a control module 140 per an electric motor 110, or two or more electric motors may share one control module 140. The control module 140 refers herein to equipment via which for example functions of the electric motor 110 may be controlled remotely from the service center 150 and/or by a person locating on the site 101 and/or by a portable user device, e.g. a smart phone, of the person, as is known in the art. The control module 140 may be attached to a motor frame of the motor 110, or comprised in an industrial automation device. The industrial automation device may be used for controlling one or more industrial processes, or devices, or equipment, according to its settings (parameter values), thereby controlling the position, speed, torque and/or direction of one or more electric motors. A non-limiting list of examples of industrial automation devices include contactors, relays, solid-state relays, drives, frequency converters, AC/DC converters, DC/AC converters, programmable logic controllers, switches, motion controllers or motion drives, soft starters, etc.

The control module 140 may comprise a micro controller unit MCU 141 at least for obtaining, for example by retrieving (reading) or by receiving, values of the temperatures from the temperature sensors 131, 132, 133 over the local connections. The values may be obtained periodically, with a fixed periodicity or with an adjustable periodicity, or non-periodically, at irregular intervals, for example as a response to a request received in the control module to obtain the values. For example, the request may be transmitted to the micro controller unit (to the control module) from the remote service center 150 and/or from the portable user device.

In the illustrated example of FIG. 1, the control module 140 is connected to the remote service center 150 for remote condition monitoring, for example. Any existing or future communication technology, wired or wireless or their combination, may be used for the connection. The remote service center 150 depicts herein a remote site that comprises one or more computing apparatuses (devices) 152 for at least remote monitoring of the one or more electric motors. A computing apparatus 152 comprises, or is connected to, one or more user interfaces (UI) 151 providing e.g. human-machine interface for user interaction and for outputting alerts. In the illustrated example, at least one computing apparatus 152 comprises a remote control unit 153 (r-c-u), for example a fouling status determination unit, for determining fouling statutes of electric motors, as will be described in detail below with FIGS. 4 and 5. The remote control unit 153 may be part of a supervisory control and data acquisition (SCADA) system.

The remote service center 150 may be a local service center in the industrial site, or company level service center, for example. The remote service center may be implemented as a cloud-based service center in a private cloud (operated solely for an organization), or in a community cloud (operated for organizations sharing e.g. mission and security requirements), or in a public cloud (provider sells cloud services) or a hybrid cloud, i.e. a composition of two or more different clouds. Examples of public cloud providers include Amazon Web Services (AWS), Google Cloud Platform (GCP), Microsoft Azure, etc. The remote service center may as well be implemented as a centralized or decentralized server in the low-power area network.

In other implementations, the control module 140, for example the micro controller unit 141, may be configured to perform the fouling status determination, as will be described in detail below with FIGS. 4 and 5. When control modules perform the fouling status determinations, the remote service center, if any exist, may be implemented without any fouling status determination unit (remote control unit), and may be configured to receive fouling status determination results, or alerts.

Figure 2:
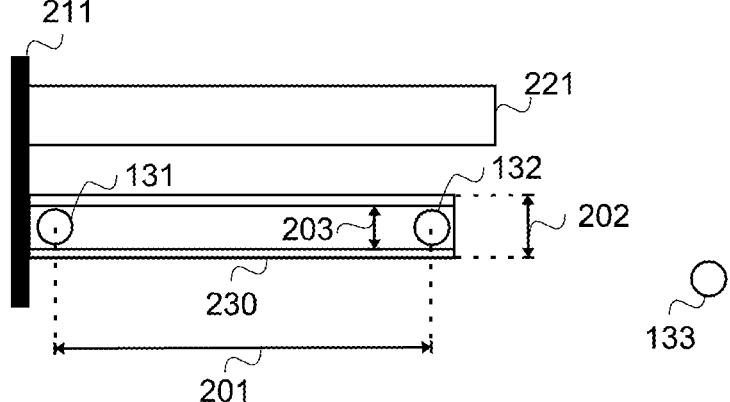
FIGS. 2 and 3 are block diagrams illustrating examples of arrangements.
Figure 3:
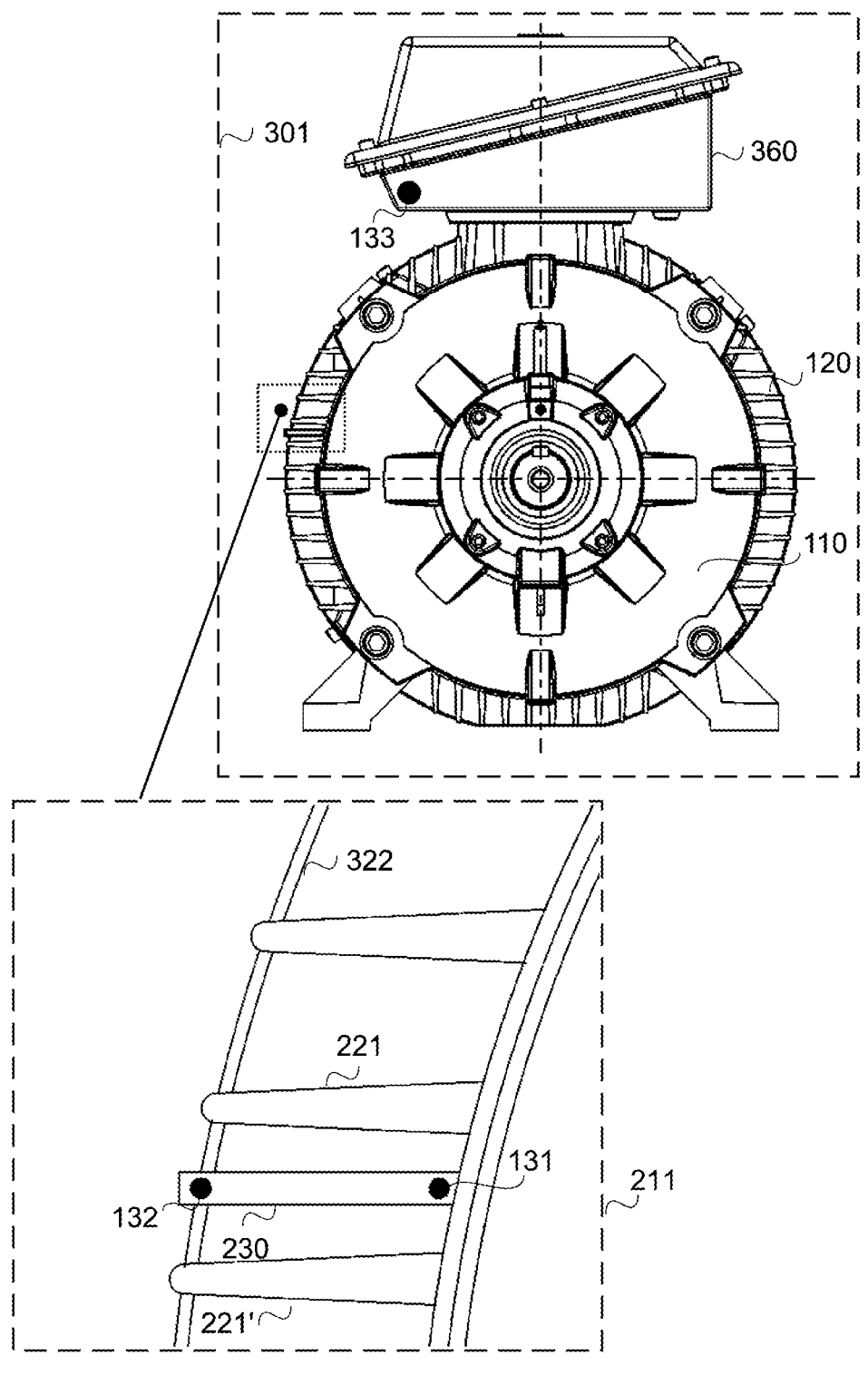

FIGS. 2 and 3 are block diagrams illustrating example sensor arrangements for an electric motor having a motor frame, FIG. 2 in a more general level.

Referring to FIG. 2, an electric motor (not shown in FIG. 2) is within a motor frame 211, and a plurality of cooling ribs, depicted by a cooling rib 221, extend from the motor frame 211. In the illustrated example of FIG. 2, a slat 230 with two temperature sensors 131, 132 is attached (fixed) at its one end to the motor frame 211 and extends from the motor frame 211, in the illustrated example in parallel with the cooling rib 221. The slat 230 is attached preferably in a way that provides a good thermal contact to the motor frame. Further, the slat 230 is preferably of the same material as the cooling ribs are. Use of the same material more accurately reflects fouling status of the cooling ribs.

In the illustrated example, the slat 230 is a hollow metallic casing, having an outer diameter 202 and an inner diameter 203, and the two temperature sensors 131, 132 are attached to the slat 230 by embedding the temperature sensors 131, 132 in the hollow metallic casing, a first temperature sensor 131 near the motor frame 211, and a second temperature sensor 132 at a distance 201 from the first temperature sensor near an outer end of the cooling rib 221.

The length of the hollow metallic casing (slat) may be equal to, smaller than, or greater than the length of the rib, the only requirement for the length being that the distance between the first and second temperature sensors allows the second temperature sensor locate near the outer end of the cooling rib or the heat sink, for example as in the illustrated example, near the outer end of the cooling rib vertically. In an implementation, the distance 201 corresponds to the length of the cooling rib measured from the motor frame to the outer end, i.e. tip of the rib. The smaller a difference between the distance and the length, the more accurately fouling status of the cooling ribs may be determined.

In the illustrated example of FIG. 2, a third temperature sensor 133 is an ambient temperature sensor measuring ambient air temperature values near the outer end of the cooling rib, preferably in an area that is not heated by the electric motor at least when the cooling ribs are clean and in which air may freely move.

Referring to FIG. 3, the arrangement 301 comprises an electric motor 110 with a cooling arrangement 120 that have a ducted fan (not shown in FIG. 3) to force air, via a fan cowling 322, over a plurality of cooling ribs 221, 221' that extend (protrude) from the motor frame 211. In the illustrated example, the arrangement comprises between two cooling ribs 221, 221' a slat 230 with two temperature sensors 131, 132, attached to the slat. Examples of the slat and how the temperature sensors 131, 132 may be attached are described above with FIG. 2, not repeated herein.

In the illustrated example of FIG. 3, the ambient temperature sensor 133 is mounted on a box 360, called herein a terminal box. The terminal box may be called a connection box. It should be appreciated that the ambient temperature sensor may locate at another location. The terminal box 360 is in the illustrated example mounted on the motor frame. The terminal box 360 may comprise the control module, or the micro controller unit. Further, the terminal box 360 may comprise, for example on top of it, a lamp (not illustrated in FIG. 3) which may be used to indicate, for example, that maintenance, such as cleaning, is needed.

Even though in the examples of FIGS. 2 and 3, the temperature sensors 131, 132 are attached to a separate slat, it should be appreciated that the temperature sensor 131 locating near the heat source and the temperature sensor 132 locating near the outer end of the cooling rib extending from the heat source may be attached to, or embedded within, a cooling rib, when the dimensions and/or strength properties of the cooling rib allow mounting of the temperature sensors to the cooling rib, for example one to the root attached to the electric motor and one to the tip of the cooling rib. Yet a further possibility include attaching one temperature sensor to the motor frame, near the root of a cooling rib and one to the tip of the cooling rib.

Figure 4:
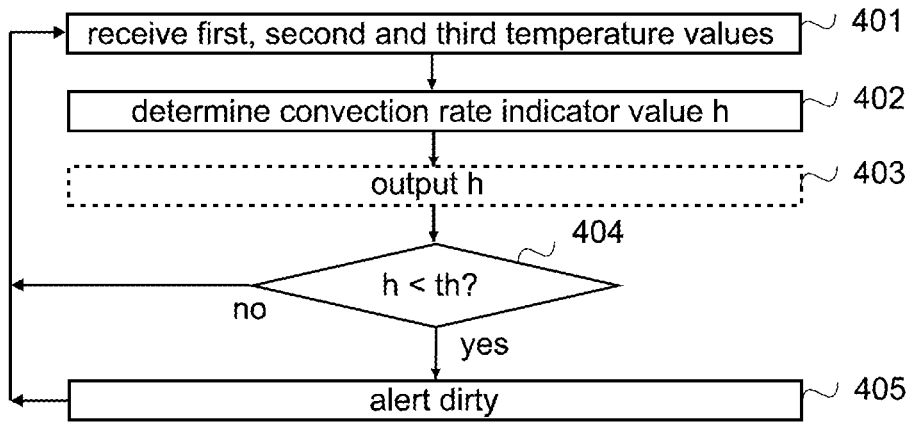
FIGS. 4 and 5 are flow chart illustrating examples of functionalities.
Figure 5:
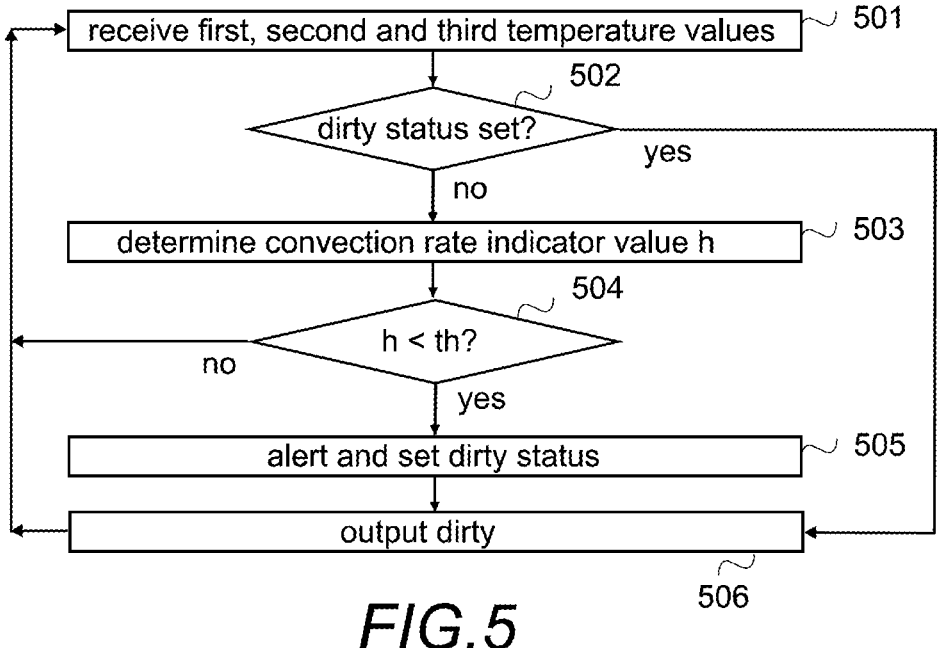

FIGS. 4 and 5 are flowcharts illustrating different functionalities of the fouling status determination unit, or the micro controller unit. The functionalities may be performed continuously, periodically, or irregularly. Referring to FIG. 4, a first temperature value indicating a temperature near a heat source, a second temperature value indicating a temperature near an outer end of a cooling rib extending from the heat source, and a third temperature value indicating an ambient temperature in the location of the heat source are received in step 401. Referring to examples of FIG. 1, FIG. 2 and FIG. 3, temperature values measured by the sensors 131, 132 and 133 are received in step 401.

Then a convection rate indicator value h is determined in step 402, using at least the received first, second and third temperature values. In some implementations, also a distance between measurement points of the first and second values and/or dimensions of the slat may be taken into account. For example, for the hollow metal casing in FIG. 2, the convection rate indicator value h may be a convection rate value h in W/m²K determined by calculating it using equation (1), obtained as follows:

$$T_x = Tamb + (Tr - Tamb)\, e^{-\sqrt{\frac{2hR_2}{k(R_2^2 - R_1^2)}}\,x} \tag{1}$$

$$\text{Let } k_{sensor} = \frac{2R_2}{k(R_2^2 - R_1^2)}$$

$$\text{Then } h = \frac{\left(-\ln\left(\frac{T_x - T_{amb}}{T_r - T_{amb}}\right)\right)^2}{k_{sensor}\,x^2}$$

$$h = \frac{k(R_2^2 - R_1^2)\ln\left(\frac{T_{amb} - T_r}{T_{amb} - T_x}\right)^2}{2R_2 x^2}$$

wherein
h=convection rate indicator value (convection rate value)
k=thermal conductivity of the metal of the hollow metal casing
R2=outer radius of the hollow metal casing
R1=inner radius of the hollow metal casing
$T_{amb}$=ambient temperature value
$T_r$=temperature value near the motor frame or cooling rib root (first temperature sensor)
$T_x$=temperature value near the outer end of the cooling rib, or cooling rib tip (second temperature sensor)
x=distance between the first and second temperature sensors embedded in the metal casing
Similar principles may be used for other cross-sections as well to obtain equation to calculate convection rate values h in W/m²K.

The temperature difference between the first temperature value and the second temperature value indicates effectiveness of the cooling rib, and the ambient temperature value allows to take into account changes in the temperature in the environment that may impact to the difference so that the convection rate determined is more sensitive to dust and other dirt. Hence, using the three temperature values, a more robust and accurate estimate of the dirtiness can be obtained. For example, if the ambient temperature remains stable, a dust accumulation will cause that a convection rate will become smaller.

In some implementations, a convection rate indicator value, which is a modified convection rate value, may be calculated using another equation, for example one of following equations:

$$h\_ind\,1 = \frac{k\ln\left(\frac{T_{amb} - T_r}{T_{amb} - T_x}\right)^2}{2x^2}$$

-continued $$h\_\text{ind}\,2 = \ln\left(\frac{T_{amb} - T_r}{T_{amb} - T_x}\right)^2$$

In some implementations, the convection rate indicator value h determined in step 402 may be output in step 403, for example displayed in a user interface for remote monitoring purposes. However, step 403 may be omitted.

After the convection rate indicator value h is determined, fouling status of the cooling ribs (heat sink) is determined using the convection rate indicator value h.

In the illustrated example, the determining the fouling status (step 404) comprises comparing the convection rate indicator value h to a preset threshold th, and determining that the fouling status is dirty when the convection rate is below the preset threshold. When equation (1) is used to calculate the convection rate, the value of the preset threshold may be 15 W/m²K, for example. The value of the preset threshold may be determined experimentally, and/or it may be adjusted based on a maintenance person's assessment on the cleanliness when the person cleans the cooling ribs after a maintenance alert has been triggered.

When the fouling status is determined to be dirty (step 404: yes), a maintenance alert is triggered in step 405, and the process continues to step 401 to receive temperature values. The maintenance alert may indicate that the cooling ribs are getting dirty, e.g dusty, and may need cleaning. The maintenance alert may be output using various techniques known in the art. For example, a message for prompting cleaning of the cooling ribs, e.g. a heat sink of an electric motor, may be displayed on the control module and/or in the user interface in the remote service center, and/or a lamp located on the connection box may be blinked, and/or an icon depicting the heat sink, and/or the heat source cooled, on a screen in the remote service center starts to blink or changes color. After cleaning the convection rate h will again be above the threshold.

If the fouling status is not determined to be dirty (step 404: no), the process continues to step 401 to receive temperature values.

As can be seen, a proactive, timely alert to clean is provided, without prescheduled maintenance breaks that are scheduled to happen just in case the cooling ribs might be dirty. This increases productivity while the temperature of the heat source will remain within target temperatures.

In the example of FIG. 5, information on whether a dirty status has been set is maintained. In the illustrated example it is assumed, that the dirty status will be set by the process, and the dirty status may be set off manually, on the site, for example by pushing a button in the control module, or in response to a user input acknowledging the cleaning in the maintenance system, or in the monitoring system.

Referring to FIG. 5, a first temperature value indicating a temperature near a heat source, a second temperature value indicating a temperature near an outer end of a cooling rib extending from the heat source, and a third temperature value indicating an ambient temperature in the location of the heat source are received in step 501.

Then it is checked in step 502, whether the dirty status is set. If the dirty status is not set (step 502: no), a convection rate indicator value h is determined in step 503, for example as described with step 402 above, and fouling status of the cooling ribs is determined using the convection rate indicator value h. Also in the illustrated example of FIG. 5, the determining the fouling status (step 504) comprises comparing the convection rate indicator value h to a preset threshold th, and determining that the fouling status is dirty when the convection rate is below the preset threshold.

When the fouling status is determined to be dirty (step 504: yes), a maintenance alert is triggered in step 505, as described above with step 405, the dirty status is set in step 505 and an indication that the status is dirty is output in step 506. The outputting may be performed, when the dirty status is set, as part of the maintenance alert. The process then continues to step 501 to receive temperature values.

If the fouling status is not determined to be dirty (step 504: no), the process continues to step 501 to receive temperature values.

If the dirty status is set (step 502: yes), the process proceeds to step 506 to output an indication that the status is dirty. For example, a message for prompting cleaning of the cooling ribs, may be displayed again, or blinked, and/or a lamp located on the connection box may be blinked again, or blinking interval adjusted, to draw even more attention to the alert. The process then continues to step 501 to receive temperature values. However, since it is known that the status is dirty, no processing capacity is used to determine the status.

Figure 6:
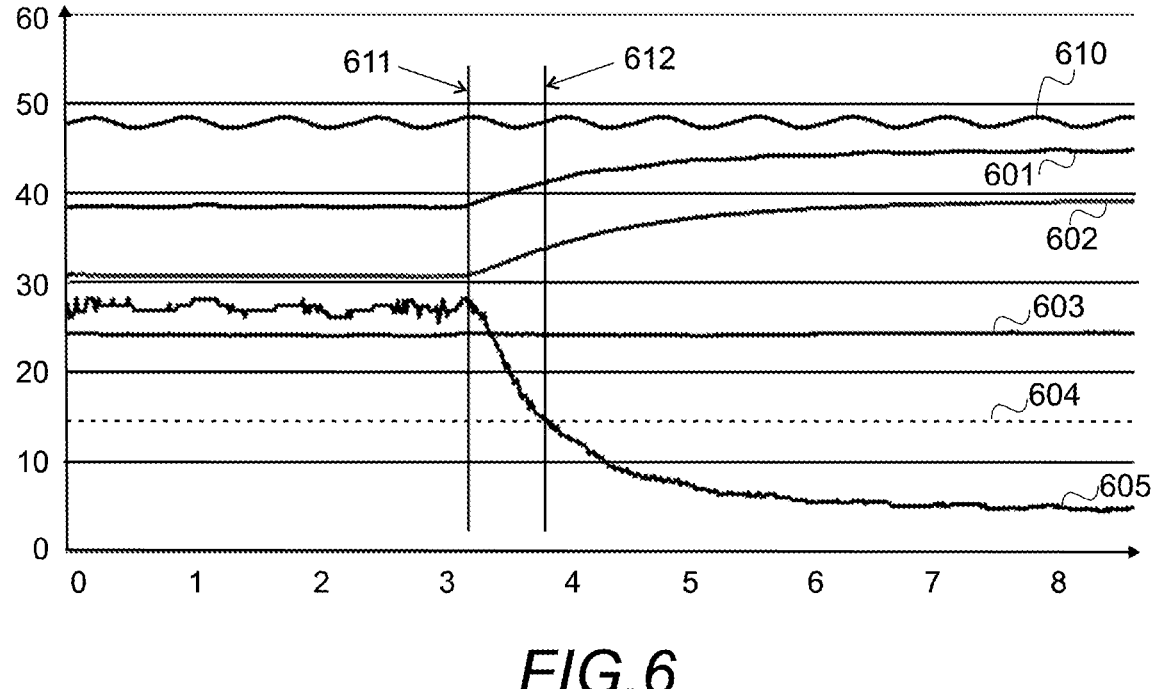
FIG. 6 illustrates simulation results.

FIG. 6 illustrates simulation results of a system simulating dust accumulation. The system comprised a metal plate, having below the plate a heater at one end of the plate, the heater heating the plate and simulating the heat source, e.g. a motor heating the heat sink, a first probe measuring temperatures inside the plate, the first probe simulating the sensor near the heat source, a second probe, vertically above the plate and the first probe, the second probe simulating the sensor near an outer end of a cooling rib (outer end of the heat sink), an ambient probe, and a fan above the plate, in opposite end of the plate than the heater, the fan being arranged to blow 1.6 m/s airflow towards the second probe. Accumulation of the dust was simulated by inserting 24 mm thick cashmere sleeves around the second probe.

Referring to FIG. 6, the values in y-axis are either temperatures in Celsius, or convection rate h values W/m²K, and x-axis indicates time. Temperature values of the first probe (sensor near the heat source) are illustrated by line 601, temperature values of the second probe (sensor near the outer end of a cooling rib) are illustrated by line 602, and temperature values of the ambient probe are illustrated by line 603. The preset threshold is depicted by line 604, the value used being 15 W/m²K. Convection rate values h, depicting in the example convection rate indicator values, calculated from the values of the three probes are illustrated by line 605. Line 610 indicates the temperature in the heater by a heater temperature controller. Line 611 indicates the time when the cashmere sleeves were put on the second probe, and line 612 indicates the time when the convection rate indicator value is not any more above the threshold, and a maintenance alert will be triggered.

As can be seen from FIG. 6, the convection rate is sensitive to dust, and hence the convection rate indicator values can be used as a proxy for dustiness, for example.

FIG. 6 shows also that a temperature difference between temperature values measured by the first probe and the second probe decreases, and hence could be used to determine the fouling status without the ambient temperature values. However, as can be seen from FIG. 6, the change in the temperature difference between temperature values illustrated by lines 601 and 602, even when combined with the increase in the temperature values, is less sensitive to dust than the convection rate illustrated by line 605, and hence using also the ambient temperature values (line 603) provides a better proxy for dustiness.

The steps and related functions described above in FIG. 4 and FIG. 5 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step.

The techniques described herein may be implemented by various means so that an apparatus implementing one or more functions/operations described above with an embodiment/example, for example by means of any of FIGS. 1 to 5 and any combination thereof, comprises not only prior art means, but also means for implementing the one or more functions/operations of a corresponding functionality, or a sensor arrangement, described with an embodiment, for example by means of any of FIGS. 1 to 5 and any combination thereof, and it may comprise separate means for each separate function/operation, or means may be configured to perform two or more functions/operations. For example, one or more of the means and/or of the above described units for one or more functions/operations described above may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 7:
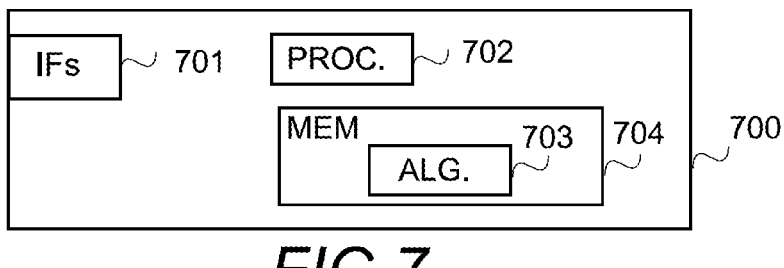
FIG. 7 is a schematic block diagram.

FIG. 7 is a simplified block diagram illustrating some units for an apparatus 700 comprising the remote control unit and/or the fouling status determination unit, or any corresponding unit, or configured otherwise to perform at least some functionality described above, for example by means of any of FIGS. 1 to 5 and any combination thereof, or some of the functionalities if functionalities are distributed in the future. The apparatus may be a control module for the heat source, a portable user device, a computing apparatus in a remote service center, e.g. a server in a cloud-based service center, that may be part of SCADA system, etc. In the illustrated example, the apparatus comprises one or more interface (IF) entities 701, such as one or more user interfaces and one or more communication interfaces, one or more processing entities 702 connected to various interface entities 701, and to one or more memories 704.

The one or more interface entities 701, which may include user interface entities, are entities for receiving and transmitting information, e.g. temperature values or alerts, such as communication interfaces comprising hardware and/or software for realizing communication connectivity according to one or more communication protocols, or for realizing data obtaining, or receiving, or for providing user interaction via one or more user interfaces, e.g. human-machine interfaces. The one or more user interfaces may be any kind of a user interface, for example a screen, a keypad, or an integrated display device or external display device.

A processing entity 702 is capable to perform calculations and configured to determine the fouling status, e.g. implement the remote control unit and/or the fouling status determination unit, or any corresponding unit, or at least part of functionalities/operations described above, for example by means of any of FIGS. 1 to 5 and any combination thereof, as a corresponding unit or a sub-unit if a distributed scenario is implemented, with corresponding algorithms 703 stored in the memory 704. The entity 702 may include a processor, controller, control unit, micro-controller unit, etc. suitable for carrying out embodiments or operations described above, for example by means of any of FIGS. 1 to 5 and any combination thereof. Generally the processor is a central processing unit, but the processor may be an additional operation processor.

A memory 704 is usable for storing a computer program code required for the remote control unit and/or the fouling status determination unit, or any corresponding unit, or for one or more functionalities/operations described above, for example by means of any of FIGS. 1 to 5 and any combination thereof, i.e. the algorithms for implementing the functionality/operations described above by means of any of FIGS. 1 to 5 and any combination thereof. The memory 704 may also be usable for storing other possible information, for example temperature values or convection rate indicator values.

The algorithms 703 are software code, i.e. instructions, forming at least one portion of a computer program. The computer program may be in source code form, object code form, or in some intermediate form, and it may be stored in some sort of carrier, which may be any entity or device capable of carrying the program. For example, the computer program may be stored on a computer program distribution medium readable by a computing device or a processor. The computer program medium may be, for example but not limited to, an electrical carrier signal, software distribution package, or a non-transitory medium, for example. Coding of software for carrying out the embodiments as shown and described is well within the scope of a person of ordinary skill in the art.

As a summary, the apparatus 700 configured for functions/operations described herein, for example by means of means of any of FIGS. 1 to 5 and any combination thereof, may be configured as a computer or a processor, or a microprocessor, such as a single-chip computer element, or as a chipset, or one or more logic gates including at least a memory for providing storage area used for arithmetic operation and an operation processor for executing the arithmetic operation. The apparatus 700 may comprise one or more computer processors, application-specific integrated circuits (ASIC), digital signal processors (DSP), digital signal processing devices (DSPD), programmable logic devices (PLD), field-programmable gate arrays (FPGA), graphics processing units (GPU), and/or other hardware components that have been programmed and/or will be programmed by downloading computer program code (one or more algorithms) in such a way to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus, constitute the remote control unit and/or the fouling status determination unit, or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the units for one or more functions/operations described above, for example by means of any of FIGS. 1 to 5 and any combination thereof, may be an element that comprises one or more arithmetic logic units, a number of special registers and control circuits.

It will be obvious to a person skilled in the art that, as technology advances, the inventive concept can be implemented in various ways. The invention and its embodiments are not limited to the examples described above but may vary within the scope of the claims.

The invention claimed is:

1. A computer-implemented method comprising:
receiving a first temperature value indicating a temperature near a heat source, a second temperature value indicating a temperature near an outer end of a cooling rib extending from the heat source, and a third temperature value indicating an ambient temperature in the location of the heat source;
determining, using at least the received first, second and third temperature values, a convection rate indicator value;
determining, using the convection rate indicator value, fouling status of cooling ribs cooling the heat source; and
triggering a maintenance alert when the fouling status is dirty.

2. The method of claim 1, wherein the determining the fouling status comprises:
comparing the convection rate indicator value to a preset threshold; and
determining that the fouling status is dirty when the convection rate is below the preset threshold.

3. The method of claim 1, further comprising:
determining the convection rate indicator value using a distance between measurement points of the first and second values.

4. The method of claim 1, further comprising:
maintaining information on whether a dirty status has been set;
when the dirty status has not been set, performing determining the convection rate indicator value and the fouling status; and
setting, when triggering the maintenance alert, the dirty status.

5. An arrangement comprising at least:
a heat source;
a plurality of cooling ribs, extending from the heat source, arranged to cool the heat source;
a first temperature sensor near the heat source to measure first temperature values;
a second temperature sensor near an outer end of a cooling rib, at a distance from the first temperature sensor to measure second temperature values;
an ambient air temperature sensor to measure third temperature values in an environment at a location the heat source is; and
a fouling status determination unit configured to obtain the first temperature values, the second temperature values and the third temperature values to determine fouling status of the cooling ribs.

6. The arrangement of claim 5, wherein the fouling status determination unit is configured to:
determine convection rate indicator values using at least the first temperature values, the second temperature values, and the third temperature values;
determine, using the convention rate values, the fouling status; and to trigger a maintenance alert when the fouling status is determined to be dirty.

7. The arrangement of claim 5, further comprising:
a slat between two cooling ribs, wherein the first temperature sensor and the second temperature sensors are attached to the slat.

8. The arrangement of claim 7, wherein the slat is a hollow metal casing, and the first temperature sensor and the second temperature sensor are embedded in the hollow metal casing.

9. The arrangement of claim 5, wherein the fouling status determination unit is configured to obtain the temperature values periodically.

10. The arrangement of claim 5, wherein the heat source is an electric motor within a motor frame and the plurality of cooling ribs are extending from the motor frame, arranged to cool the electric motor.

11. The arrangement of claim 10, further comprising a terminal box for the electric motor, wherein the ambient air temperature sensor is attached to the outer surface of the terminal box.

12. The arrangement of claim 10, further comprising a motor controller unit connectable to the temperature sensors and including the fouling status determination unit.

13. The arrangement of claim 5, further comprising:
a micro controller unit connectable to the temperature sensors for obtaining the temperature values; and
a remote control unit connectable to the micro controller unit to obtain the temperature values, the remote control unit including the fouling status determination unit.

14. An apparatus comprising:
at least one interface configured to receive a first temperature value indicating a temperature near a heat source, a second temperature value indicating a temperature near an outer end of a cooling rib extending from the heat source, and a third temperature value indicating an ambient temperature in the location of the heat source;
at least one processor; and
at least one memory storing instructions,
wherein the at least one memory and the instructions configure, with the at least one processor, the apparatus at least to:
determine, using at least the received first, second and third temperature values, a convection rate indicator value;
determine, using the convection rate indicator value, fouling status of cooling ribs cooling the heat source; and
trigger a maintenance alert when the fouling status is dirty.

15. The apparatus of claim 14, wherein the at least one memory and the instructions configure, with the at least one processor, the apparatus to determine the fouling status at least by:
comparing the convection rate indicator value to a preset threshold; and
determining that the fouling status is dirty when the convection rate indicator value is below the preset threshold.

16. The apparatus of claim 14, wherein the at least one memory and the instructions configure, with the at least one processor, the apparatus to determine the convection rate indicator value using also a distance between measurement points of the first and second values.

17. The apparatus of claim 14, wherein the at least one memory and the instructions configure, with the at least one processor, the apparatus at least to:

maintain information on whether a dirty status has been set;

when the dirty status has not been set, perform determining the convection rate indicator value and the fouling status; and set, when triggering the maintenance alert, the dirty status.

18. The apparatus of claim 14, wherein the apparatus is a micro controller unit.

19. The apparatus of claim 14, wherein the apparatus is a portable user device.

20. The apparatus of claim 14, wherein the apparatus is a server in a service center, which is remote to the heat source.

* * * * *